(No Model.)
J. A. MILLER & T. S. & H. G. LESTER.
NAUTICAL COURSE INDICATOR.
No. 474,846. Patented May 17, 1892.
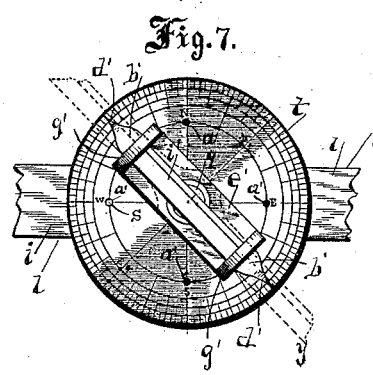
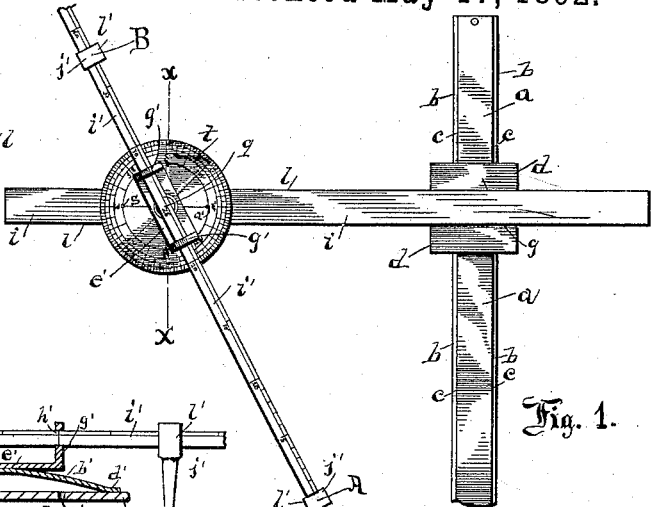
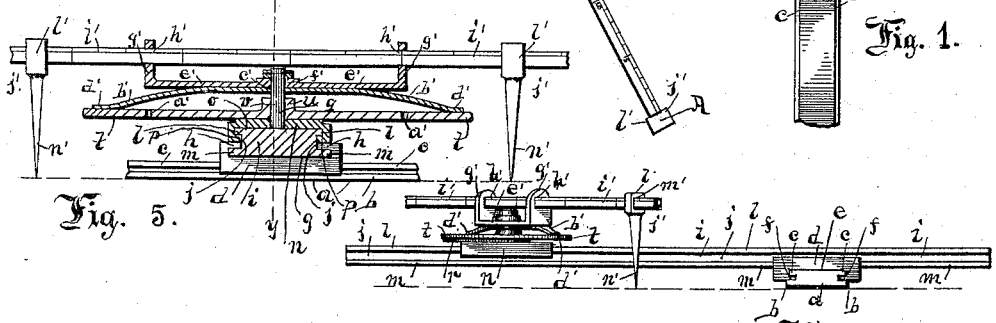
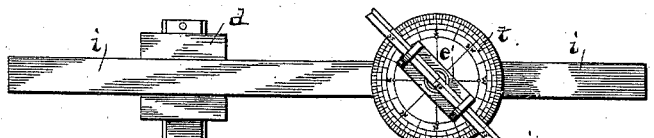
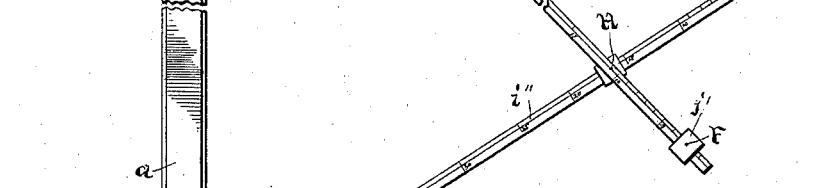
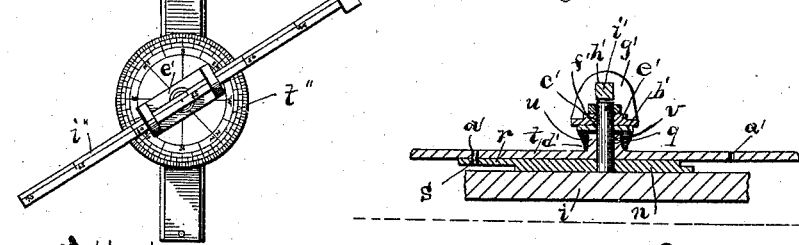
Attest
Geo. P. Thomas.
J. M. Maxon.
Inventors
John A. Miller.
Thomas S. Lester.
Henry G. Lester
By Jas. E. Thomas Atty.

UNITED STATES PATENT OFFICE.

JOHN A. MILLER, THOMAS S. LESTER, AND HENRY G. LESTER, OF MARINE CITY, MICHIGAN.

NAUTICAL COURSE-INDICATOR.

SPECIFICATION forming part of Letters Patent No. 474,846, dated May 17, 1892.

Application filed April 18, 1891. Serial No. 389,398. (No model.)

*To all whom it may concern:*

Be it known that we, JOHN A. MILLER, THOMAS S. LESTER and HENRY G. LESTER, citizens of the United States, residing at Marine City, in the county of St. Clair and State of Michigan, have invented certain new and useful Improvements in Nautical Course-Indicators, of which the following is a specification, reference being had therein to the accompanying drawings.

Our invention relates to improvements in devices for indicating or determining distances and directions on a chart for enabling the pilot to determine the proper course in which to steer a vessel in order to reach a desired point; and the objects of the invention are, first, to provide an instrument for use in connection with a chart which will enable the pilot or master of a vessel to quickly and accurately ascertain the location of a vessel and the proper course in which to steer in order to reach a predetermined point, locality, or port.

Another object of the invention is to provide a device for operating upon a chart by which the distance from one point to another on the course of a vessel can be quickly determined and the proper course for steering the vessel to reach the desired point or destination will be indicated and calculated; and our invention consists in the construction and operation of the several devices used in the machine, together with the combination of the same, which will be hereinafter fully described, and which will be also specifically defined in the claims of this specification.

In the accompanying drawings, in which the same letters of reference will be found indicating the same elements in each of the several views, our invention is illustrated, Figure 1 therein being a plan view of our improved device with the parts in position for operation to indicate the course in which to steer a vessel to reach a determined point. Fig. 2 is a side elevation of the same. Figs. 3 and 4 are plan views of the machine in a modified form and arranged for determining the locality in which a vessel lies at a particular time. Fig. 5 is an enlarged section of Fig. 1, taken at $xx$. Fig. 6 is a vertical section of Fig. 5, taken at $yy$. Fig. 7 is a plan view of the compass-dial enlarged.

$a$ represents a base-piece having parallel edges $b$, and these edges are provided with longitudinal grooves forming ways $c$.

$d$ is a saddle having in one side a transverse groove $e$, with the side of the groove provided with inwardly-projecting lips $f$, fitted to pass closely over the ways $c$ and to slide freely thereon, and in the opposite side of the saddle and transversely with the groove $e$ is formed a groove $g$, having lips $h$, similar in form and arrangement to the groove $e$.

$i$ is a bar provided on its lateral edges with longitudinal groove $j$, forming the upper ways $l$ and the lower ways $m$, which are fitted to and passed into the groove $g$ in a manner to slide easily thereon, so that the bar $i$ will lie transversely with and at a right angle to the bar $a$.

$n$ is a saddle provided on its under side with a groove $o$, having on its inner edges the projecting lips $p$, fitted to pass over and slide easily upon the ways $l$ without lateral movement, and from the upper side of the saddle projects a centrally-located spindle $q$, while from a portion $r$, projecting laterally from the saddle, as shown in Fig. 5, projects upwardly the lug or stud $s$, located directly over the transverse center of the bar.

$t$ is a circular plate or disk provided on its upper side with a central hub portion $u$, having an opening $v$ passed over the spindle $q$, and the plate is provided on its upper surface with a scale and radial lines representing the points and degrees of a compass-dial, with the four principal points or radial lines marked in the usual way with the letters "N.," "S.," "E.," "W.," and on these lines are formed openings $a'$, either one of which will pass over the stud $s$ and bring the opposite points of the compass in alignment with the transverse center of the bar $i$.

$b'$ is a spring having a central opening $c'$ passed over the spindle $q$ and with its end portions bent downward and bearing upon the face of the dial and provided with points $d'$ diametrically opposite each other, and $e'$ is a frame provided in the base portion with an opening $f'$, passed over the spindle $q$ and against the inner portion of the upper face of the spring $b'$, to which it is secured against turning in some convenient manner, so that the longitudinal centers of the frame $e'$ and the spring are in alignment, and the end portions $g'$ of the frame are turned upward and provided with openings $h'$, through which is passed a bar $i'$. The frame $e'$ is secured upon the spindle $s$ by a collar $j$, so that the spring will bear upon the disk and will permit the disk to be raised to free the opening $a'$ from the stud $s$, so that the disk may be turned to bring the desired points in alignment with the bar, and the stud $s$ then enters another of the openings $a'$ and is held in position by the spring.

The bar $i'$ is arranged to slide easily through the openings $h'$, and upon the upper surface of the bar is arranged a scale of miles corresponding to the scale on which the chart is made, and $j'$ are indicators having a head portion $l'$, provided with a transverse opening $m'$, passed over the bar $i'$, and are provided on their downwardly-extending end portions with indicator-points $n'$, reaching to the bottom of the base-bar $a$ and in alignment with the transverse center of the bar $i'$.

For use in ascertaining the proper direction in which to steer a vessel to reach a desired point the base-bar $a$ is placed upon the chart with its lateral side coincident with the parallel lines on the chart—say, for convenience, the north and south lines—and the bar $i$ will then be located parallel with the east and west lines. The compass-dial $t$ is then revolved to bring the north and south marks thereon to correspond with the north and south lines on the chart, and the saddle $n$ is then moved, together with the compass-dial and bar $i'$, to bring one of the indicator-points $n$ over the point of starting (shown at A on the drawings, Fig. 1) and the other over the point to be reached, (shown at B,) and the indicator-points $d'$ will then show on the dial the course to steer to reach the desired point, and the scale of miles upon the bar $i'$ will then show the distance from one point to the other, and in order to sail along a coast or on a varying course the points are marked upon the chart and the bar $i'$ is then moved to determine the direction by compass from the first point to the second, as before described, and from the second to the third, &c., each part of the course being indicated upon the compass-dial with the utmost accuracy and without calculating, together with the number of miles from point to point.

A compass-dial $t''$ and its attachments, as before described, for mounting the dial $t$ can be used with its sliding saddle mounted directly upon the base-plate $a$, if desired, as shown in Fig. 3, the operation of the parts being substantially the same as before described, the course between the points, as C and D, on the chart being ascertained and indicated by setting the base-bar $a$ parallel with the lines of the chart and moving the compass-dial $t''$ thereon to a position to bring the bar $i''$ and the indicator-points over the locations C and D, and the direction will then be found indicated by the pointers $d'$ on the dial, the range of this form of device being, however, limited on account of the dial being only capable of movement in one direction.

In Fig. 4 is shown the devices as illustrated in Fig. 1, with the dial $t$ moved to another position upon the arm $i'$ and arranged for use together with devices shown in Fig. 3. The dial $t''$ and the saddle $d$ being mounted upon the said bar $a$, the two dials being arranged for quickly ascertaining the location of a vessel on the chart, and the direction to two stationary points E and F being ascertained by compass, the compass-dial $t''$ is moved to register the bar $i''$ with the station E, with the indicators $d'$ registering the direction on the dial indicated by the compass, and the bar $i'$ then crossing the bar $i''$ is registered with the other point F, with the pointers $d'$ on the dial registering with the direction indicated by the compass to the point F, and the crossing H of the bars $i'$ and $i''$ will be the location of the vessel, which, being formed, either compass-dial and sliding bar can then be used, as before described, for ascertaining the proper course for the vessel to take to reach a desired point.

It will be seen that by the use of our improved device, the course of a vessel may be quickly and accurately ascertained, together with the distance to be traversed from one point to another, without liability of error, reasonable precaution being taken to place and retain the base-bar parallel with the chart-lines, and a great saving of time and calculations is obtained thereby, as the bars and compass-dials are readily moved in the proper direction so as to reach to all points of the chart with ease and dispatch.

We have described a preferred form of construction of our improvement; but we wish it understood, however, that we do not limit the scope of our invention to the precise form and arrangement of the several parts as herein delineated and described, as very many changes of form and construction may be made and the device would operate in the same manner; and the most essential features of the invention consist in arranging and supporting a compass-dial so that it may be quickly moved to any position on the chart and return the position of its radial lines relative to the parallel lines on the chart, and also in providing the said compass-dial with a radial bar which can be moved to lie coincident with any desired point on the chart and with any desired point of direction on the compass-dial; and therefore, Having described the construction and operation of our invention, what we claim as new, and desire to secure by Letters Patent, is—

1. In a course-indicator, the combination of the base-bar, a saddle mounted to slide on the bar and provided with a centrally-located upwardly-projecting spindle and with an upwardly-projecting stud $s$, located at one side of the spindle, the disk having a central opening passed over said spindle and provided on its upper surface with a dial and having openings $a'$ for engaging with said stud $s$, and a spring $b'$, having a central opening passed over the spindle and with its ends bearing upon the dial, with the frame $e'$, having a central opening mounted upon the spindle and having its ends upturned and provided with openings $h'$, and the bar $i'$, passed through said openings and provided with downwardly-extending movable pointers, substantially as set forth.

2. In a nautical course-indicator, the combination of a base-bar and a saddle mounted for sliding upon the base-bar with a transverse bar mounted for sliding upon the said saddle, a disk mounted for sliding on the said transverse bar and provided on its upper surface with a compass-dial, and means for retaining the disk against revolution, and a radial indicator pivotally mounted upon the center of the disk and capable of rotation and of longitudinal movement and provided with indicator-points for reaching to the chart, substantially as set forth.

3. The combination, in a nautical course-indicator, of the base-bar, the saddle for sliding on the base-bar, the transverse bar for sliding upon the said saddle at a right angle with the base-bar, the disk mounted for sliding upon the said transverse bar and provided on its surface with a compass-dial, and device for engaging the disk against revolution with the frame $e'$, pivotally mounted upon the center of the disk and provided with upturned ends $g'$, having openings $h'$, the spring $b'$ beneath the frame $e'$ and provided with the points $d'$, and the bar $i'$, passed through the openings $h'$ and provided with indicators $j'$ and with a scale of miles upon its upper surface, substantially as set forth.

4. The combination, in a nautical course-indicator, of the base-bar, the saddle mounted for sliding on the bar, the transverse bar mounted for sliding on the said saddle, the saddle $n$, mounted on the transverse bar and provided with a centrally-located upwardly-projecting spindle $q$ and the stud $s$, a disk provided with a central opening passed over the spindle $q$ and with the openings $a'$ for engaging the stud $s$, a spring for retaining the disk in engagement with the stud $s$, a frame $e'$, provided with a central opening passed over the spindle, and devices for securing the frame upon the spindle, and the bar $i'$, passed through openings $h'$ on the said frame and provided with indicators $j'$, substantially as and for the purpose set forth.

In testimony whereof we hereunto affix our signatures in the presence of two witnesses.

JOHN A. MILLER.
THOMAS S. LESTER.
HENRY G. LESTER.

Witnesses:
V. A. SAPH,
H. P. SAPH.